J. F. GAIL.
BAR CUTTING AND STRAIGHTENING APPARATUS.
APPLICATION FILED JULY 22, 1918.

1,424,465.

Patented Aug. 1, 1922.
6 SHEETS—SHEET 1.

UNITED STATES PATENT OFFICE.

JOHN F. GAIL, OF KENOSHA, WISCONSIN, ASSIGNOR TO SIMMONS COMPANY, OF KENOSHA, WISCONSIN, A CORPORATION OF DELAWARE.

BAR CUTTING AND STRAIGHTENING APPARATUS.

1,424,465.   Specification of Letters Patent.   Patented Aug. 1, 1922.

Application filed July 22, 1918. Serial No. 246,044.

*To all whom it may concern:*

Be it known that I, JOHN F. GAIL, a citizen of the United States, residing in the city of Kenosha, county of Kenosha, and State of Wisconsin, have invented certain new and useful Improvements in Bar Cutting and Straightening Apparatus, of which the following is a specification.

My invention relates to improvements in apparatus for cutting into lengths and for straightening metal bars, such as are produced in random lengths by rolling mills, or otherwise.

The principal objects of the invention are to provide an improved apparatus of the class described in which the time and labor necessary to cut off and straighten metal bars or rods are reduced to a minimum; to provide a machine of the class described in which the straightening and the severing of the length of metal is effected efficiently and accurately; to provide an apparatus of the class described which shall be comparatively compact, simple in design and inexpensive to manufacture; and in general to provide an improved apparatus of the character referred to.

In the drawings which illustrate one embodiment of my invention as applied to apparatus for severing and straightening lengths of angle iron.

Figures 1, 7:
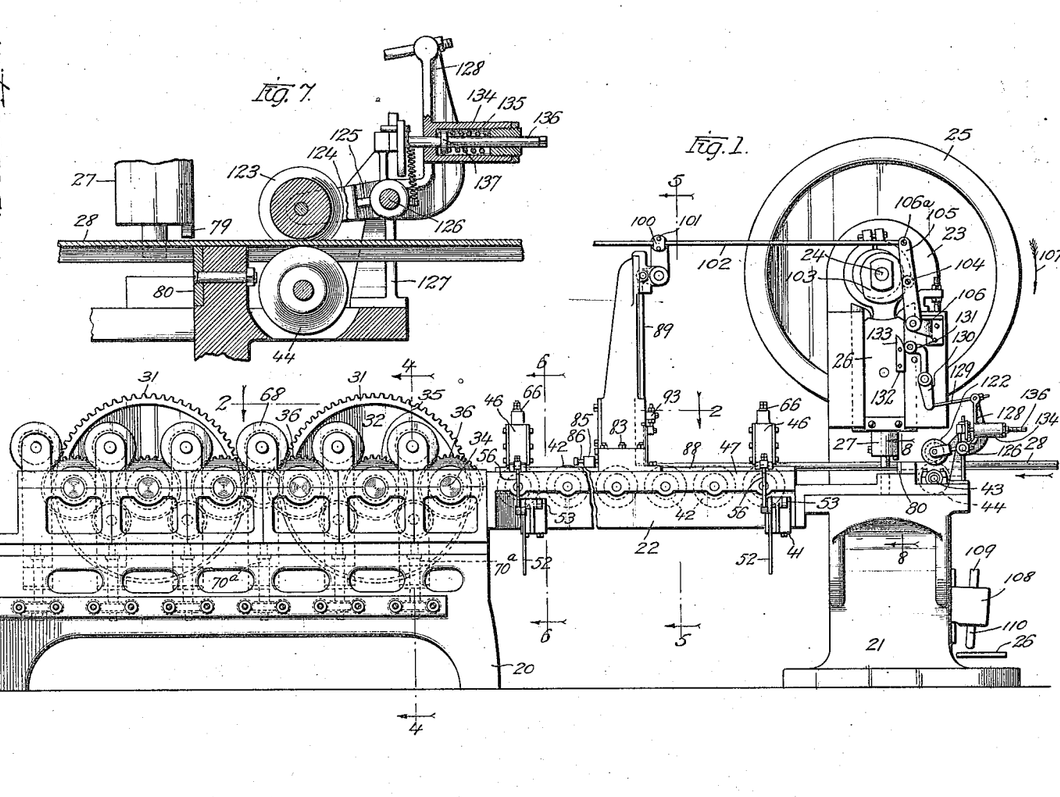
Fig. 1 is a side elevation of the cutting off and straightening apparatus.
Fig. 7 is a section taken on the line 7—7 of Fig. 3.

Referring to the drawings, in Fig. 1, 20 represents a heavy cast iron base casting for the straightening rolls, and 21 the base which supports the straightening devices and 21 is the main frame casting of the cut-off press, said two castings 20 and 21 being connected together by an intermediate frame 22, also constructed of cast iron or other suitable rigid material. The upper part of the press frame 21 is extended upwardly in the usual manner as shown at 23 in order to furnish suitable supporting bearings for the shaft 24 which carries the fly wheel 25. It will be understood that the fly wheel 25 is driven continuously by a suitable electric motor or other power and may be clutched to the crank shaft 24 by the usual trip mechanism operated by the foot treadle 26, it being understood that when the treadle 26 is pressed the shaft 24 will make a single revolution causing a vertical reciprocation of the cross head 26 on which the punch member 27 is mounted.

In the present instance the angle irons 28, which are to be cut into lengths and straightened, are supplied to the apparatus in pairs from the right of the machine as indicated in Fig. 1. The object of operating upon two lengths of angle iron at the same time is, of course, to double the output of the machine without being compelled to duplicate the entire apparatus. Where the machine is to be used for cutting off angle irons produced by a rolling mill, the apparatus is preferably located at the forward end of the cooling beds so that the ends of the cooled lengths of angle iron, will be in a position to be fed directly into the apparatus.

Figures 2, 8:
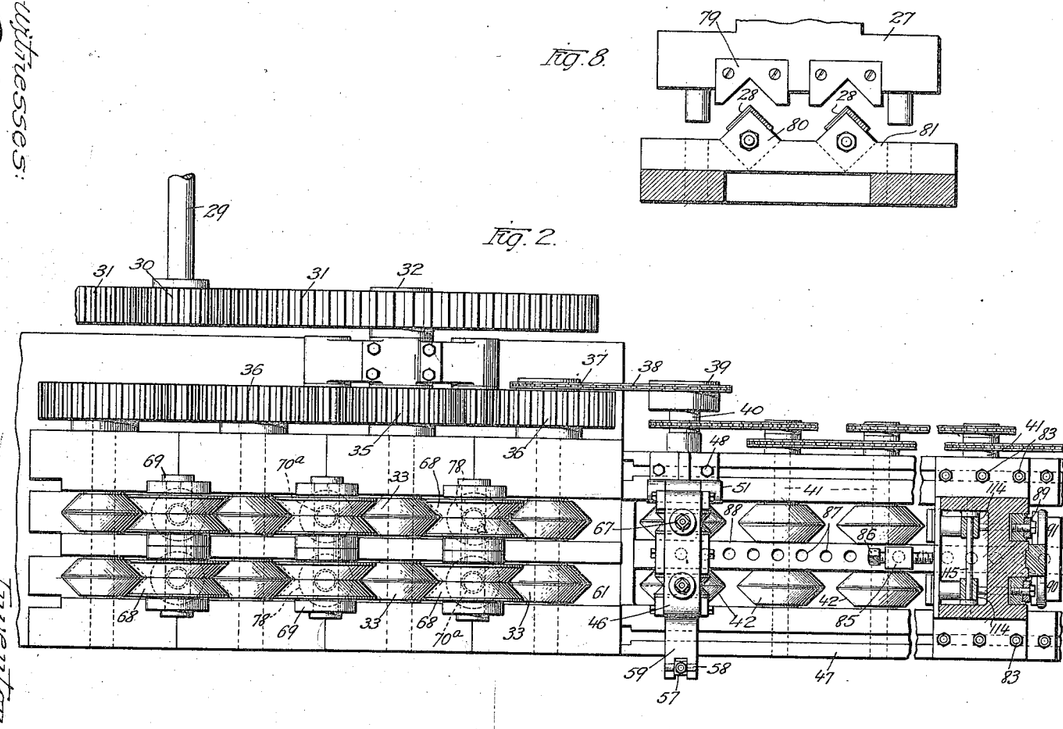
Fig. 2 is a plan view of the left hand portion of the machine shown in Fig. 1.
Fig. 8 is a section taken on the line 8—8 of Fig. 1.

Referring to Fig. 2, 29 represents a constantly running power shaft driven by an electric motor, or other suitable power, said drive shaft 29 being equipped with a spur pinion 30 which meshes with a pair of large spur gears 31 keyed to the ends of a pair of horizontal shafts 32 suitably journaled in the frame casting 20. Each of said shafts 32 carries a pair of twin supporting rolls 33, and also a pinion which drives the pair of shafts 34 situated on either side of and parallel with said shaft 32. The driving connection between each of the shafts 32, and the several shafts 34, is furnished by means of a pinion 35 keyed to each of the shafts 32, each of said pinions 35 driving a pair of gears 36 keyed to the said shafts 34. It will be understood that all of the shafts 32 and 34 are parallel and located with their axes in the same horizontal plane, each shaft being provided with a pair of convex V-shaped rolls keyed to said shafts and similar to the rolls 33 previously described.

To the rear end of that shaft 34 of the straightening apparatus which is located closest to the cut-off press, there is keyed a sprocket 37 which, by means of a chain 38 and sprockets 39, drives a horizontal shaft 40 journaled in the connecting frame casting 22. Said shaft 40, through similar chain and sprocket connections drives the parallel horizontal shafts 41, also journaled in the connecting frame casting 22, each of said shafts 40 and 41 having keyed thereon a pair of V-shaped convex rolls 42 similar to the rolls 33. The right hand or end shaft 41 also drives a feed roll shaft 43 to which are also keyed a pair of V-shaped convex feed rolls 44. It will be understood that shafts 32, 34, 40, 41 and 43 are all positively driven at the same speed and the rolls mounted thereon, excepting the rolls 43, are of the same diameter so that the angle iron after it reaches the rolls 42 will be moved at the same velocity throughout its passage through the apparatus.

In order to conduct the lengths of material through the machine a certain number of pressure rolls 45 are employed, said pressure rolls 45 being located in suitable housings 46 positioned above the shaft 40 and certain of the shafts 41. Each of said housings 46 is locked to the top of the connecting frame 22 in the following manner.

Figures 6, 12:
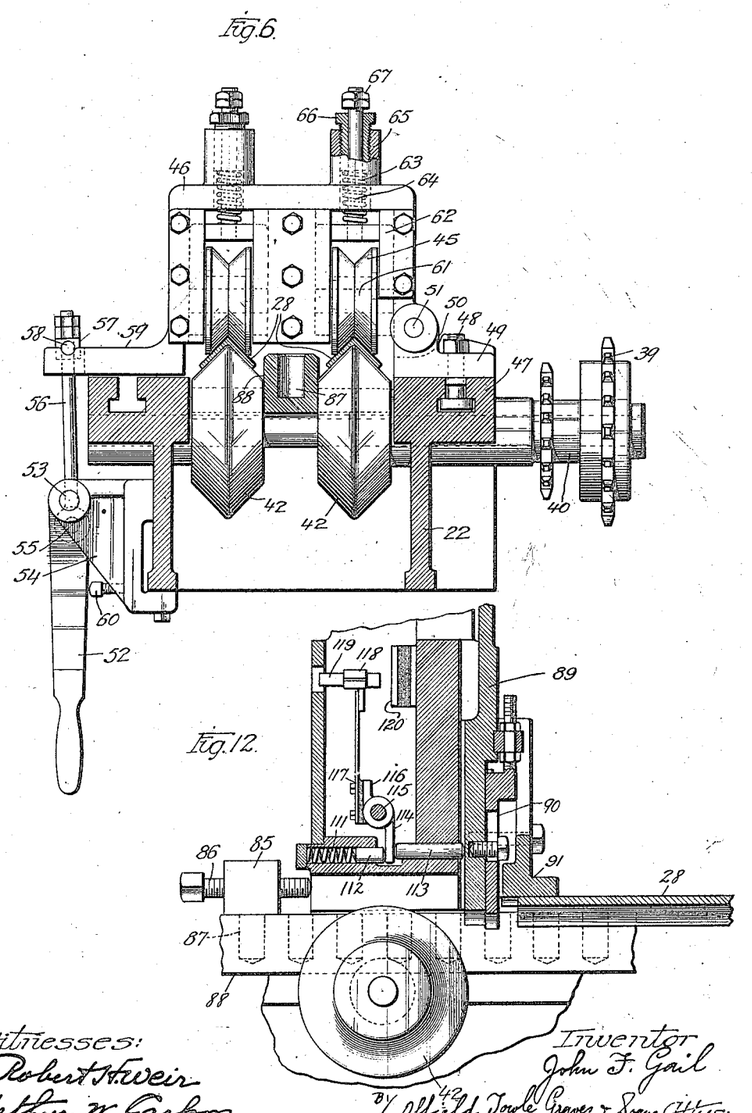
Fig. 6 is a section taken on the line 6—6 of Fig. 1.
Fig. 12 is a section taken on the line 12—12 of Fig. 5.

Referring to Fig. 6 it will be seen that a T-slot 47 formed in the top of the connecting casting 42 accommodates a T-head bolt 48 for securing to the top of said connecting casting 42 a block, or bracket 49. Said bracket 49 is formed with a pair of upstanding lugs 50 spaced apart a sufficient distance to admit the lower end of the rear side of the housing 46, a longitudinal pin 51 constituting a pivot upon which the housing 46 may be swung in a vertical plane when it is desired to expose the tops of the supporting rolls 42. The near side of the housing 46 is clamped down upon the near side of the connecting frame casting 22 by means of a hand-lever 52 keyed to a small shaft or pin 53 journaled in a fixed bracket 54. To the side of the said lever 52, and at a point spaced a short distance from the axis of the shaft 53, there is pivotally connected a link 56 by means of a pin 55 on said lever. Said link 56 carries at its upper end an adjustable block 57 from each side of which projects the end of a pin 58 arranged to engage a shallow groove in the upper surface of a lug 59 extending forwardly from the housing 46 and overlying the top of the connecting frame 22. It will be manifest that when the hand lever 52 is swung outwardly from the position shown in 56, the pin 55 will be elevated, permitting the block 57 to be disengaged from the lug 59 and allowing the housing 46 to swing upwardly and expose the supporting roll 42. The set screw 60 acts as a stop to prevent excess movement of the lever 52 when the toggle is closed thereby maintaining it in locked position.

Each of the pressure rolls 45 is mounted on a short pin or shaft 61, the ends of which are supported in the depending limbs of a U-shaped member 62 mounted to slide vertically within the housing 46. Each of the slides 62 is resiliently pressed downwardly by means of a coiled compression spring 63 which surrounds a stem 64 secured in the top of slide 62 and extending co-axially through a boss 65 on the upper surface of the housing 46. The strength of said spring may be changed by means of an adjustable bushing 66 threaded into said boss 62 and against the lower end of which bushing the spring 63 abuts. When the housing 46 is raised the roller 45 and slide 62 is prevented from dropping out by means of a pair of lock-nuts 67 threaded on to the upper protruding end of the stem 66.

Figure 4:
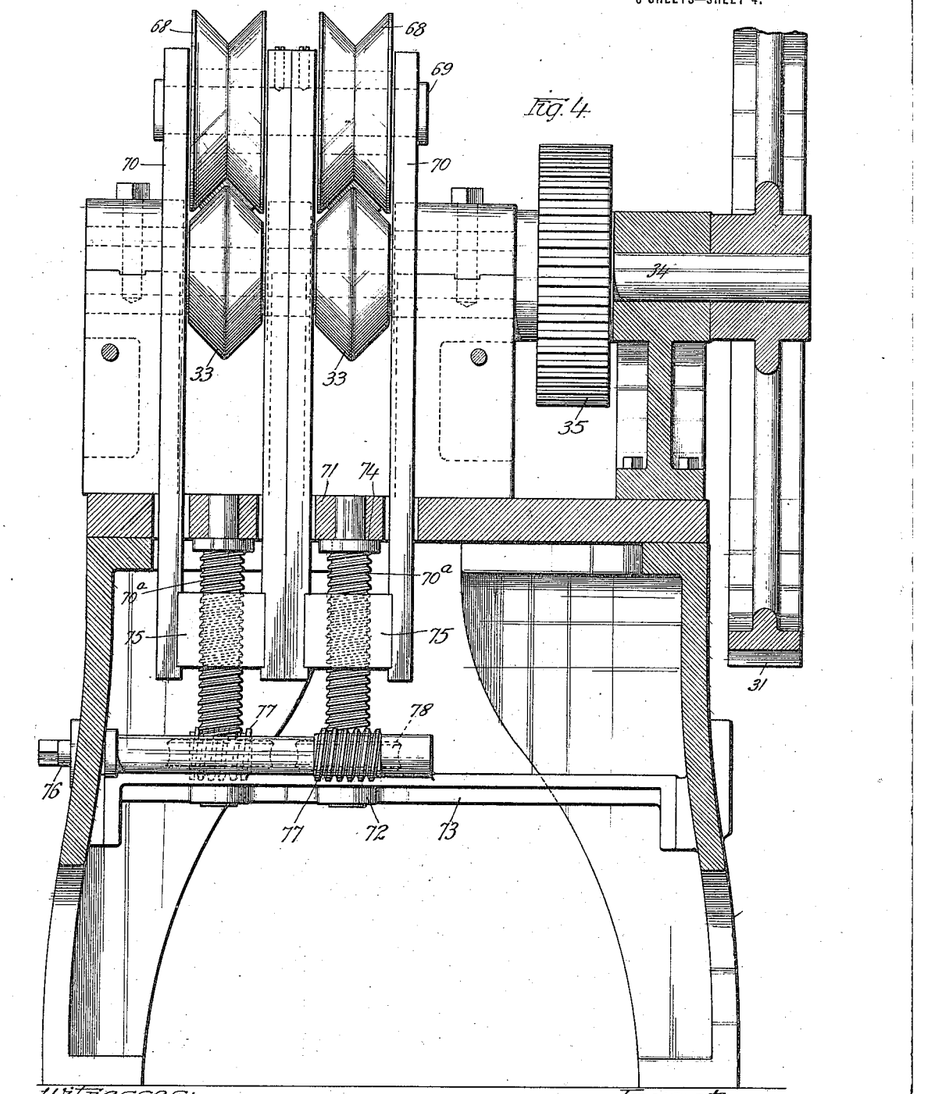
Fig. 4 is a section taken on the line 4—4 of Fig. 1.

Pressure for straightening the lengths of angle irons after they have been cut off is supplied by means of a series of straightener rolls 68 located above and intermediate the several shafts 32 and 33 of the straightening apparatus. Each of said rolls 68 is independently mounted to rotate on a pin 69, the ends of which are secured in a pair of spaced apart and vertical extending bars, or plates 70 arranged to slide vertically in the straightener frame 20. The adjacent plates 70 carrying companion straightener rolls 68 are in engagement with each other as shown at Fig. 4, but are not tied together and are capable of relative sliding movement so that each of the straightener rolls 68 may be adjusted vertically independently of its companion roll.

The adjusting mechanism for raising and lowering the straightener rolls 68 comprises a vertical feed screw $70^a$, the upper end of which is turned down and journaled in the fixed plate 71. The lower end of the fixed screw $70^a$ is journaled in a boss 72 formed on the lower frame plate 73, while upward movement of the feed screw is prevented by means of an integral shoulder or collar 74 engaging the lower face of the plate 71. Rotary movement of the feed screw $70^a$ is converted into vertical movement of the plates 70 by means of a block 75 secured between the lower ends of the plates 70, and threaded to constitute a nut for the feed screw 70ª. Each of the feed screws 70ª may be rotated independently by manually rotating a horizontal shaft 76 journaled transversely in the main frame 20 and equipped with a worm 77 meshing with the worm gear 78 keyed to the lower end of the feed screw 70ª.

The actual severing of the lengths of material is effected by two pair of cooperating punches and dies, each of the shearing punches comprising a notched steel plate 79 bolted or otherwise suitably secured in a recess in the side of the punch member 27. Each of the dies comprises a substantially square steel plate 80 secured in the shoe 81 bolted to the bed of the press.

Special means are employed for cutting off the angle iron into standard uniform lengths. Referring to Fig. 1, it will be observed that intermediate the straightening mechanism and the press there is located upon the top of the connecting frame 22 an upstanding bracket or column 82 shown in greater detail in Figs. 5 and 12. The pedestal 82 is secured to the top of the connecting frame 22 by means of bolts 83, the heads of which enter T-shaped slots 84 formed in the upper surface of said frame part 22. Creeping of the pedestal and the gauging means carried thereby is prevented by means of a block 85 which carries a set screw 86, the point of which engages the bottom part of the pedestal bracket 82. Said block 85 is securely positioned by means of an integral pin 87 arranged to enter any one of a series of holes drilled vertically through a longitudinal drop bar 88 suitably bolted or otherwise secured to the connecting frame 22.

Figures 5, 10, 11:
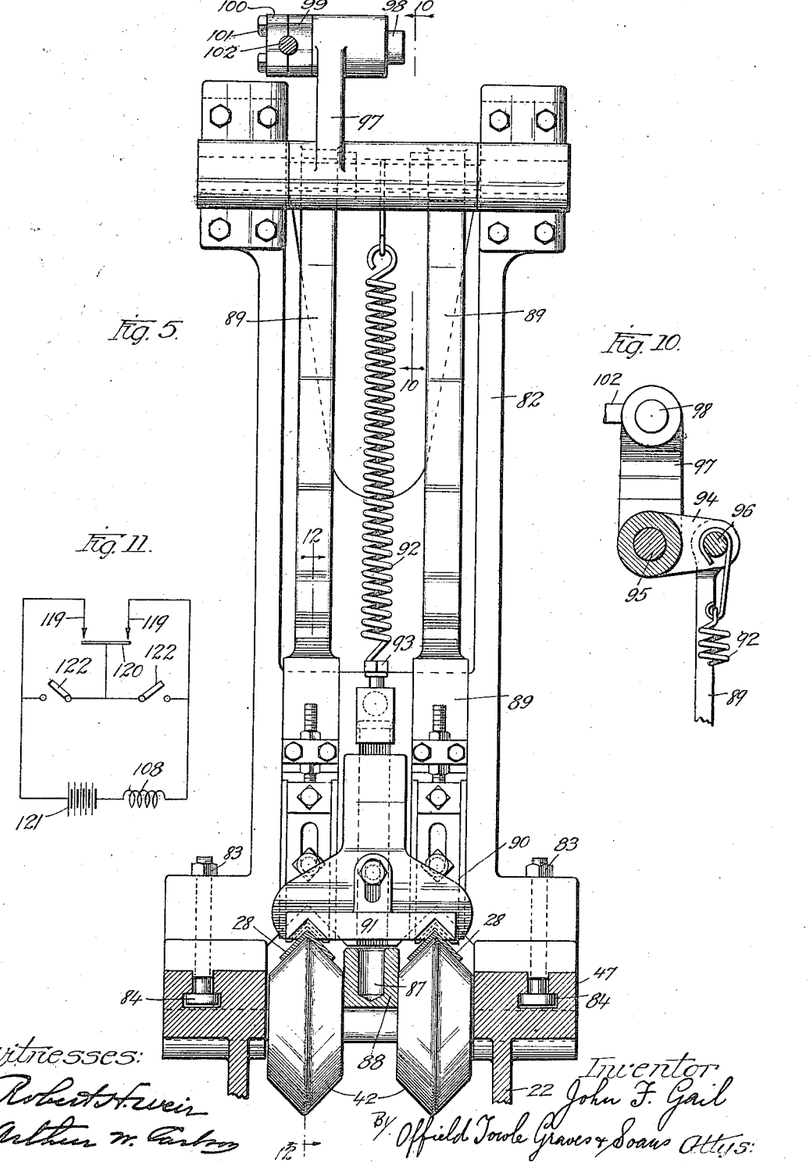
Fig. 5 is a section taken on the line 5—5 of Fig. 1.
Fig. 10 is a section taken on the line 10—10 of Fig. 5.
Fig. 11 is a circuit diagram of the automatic trip.

As shown best in Figs. 2, 5 and 12, the lower portion of the pedestal bracket 82 is planed out to provide a pair of vertically extending rectangular grooves which accommodate a pair of plungers 89, each of said plungers 89 having adjustably secured thereto a stop or gauge plate 90, the lower end of which is adapted to be engaged by the front end of the angle iron before it is severed from a continuous length. The plungers 89, in addition to their vertical movement, are capable of a slight amount of play in a horizontal direction lengthwise of the machine, such movement being limited by a transversely extending stripper block 91 bolted to the face of the lower portion of the pedestal bracket 82. The block 91 is effective as a guide for the ends of the angle irons and at the same time prevents them from rising with the gauge plates 90 when the plungers 89 are elevated. Where the two lengths of angle iron are being advanced by the driving supporting rollers towards the gauge mechanism, the plungers 89 are in a depressed position so that the lower ends of the gauge plates 90 are in a position to be engaged by the front ends of the lengths of angle irons. Said plungers 89 are held down in such position by means of a coiled tension spring 92, the lower end of which is connected to a fixed pin 93 and the upper end of which is connected to the end of an arm 94 keyed to a horizontal shaft 95 transversely journaled in the upper end of the pedestal bracket 82. In the end of said arm 94 is a pin 96, the opposite ends of which form pivotal connections for the upper ends of the plungers 89. There is also keyed to the shaft 95 an upstanding arm 97 in the upper end of which there is pivoted on a pin 98 a clamp member 99. The clamp member 99 is provided with a cap 100 and clamping screws 101 by which an operating rod 102 may be clamped in any desired longitudinal position.

The elevating of the gauge plates 90, after the punch press has severed the lengths of angle irons, is effected by means of a cam 103 keyed on the end of the shaft 24 and cooperating with a roller 104 carried by a lever 105. The lower end of the said lever 105 is pivoted to a stationary bracket 106 bolted to the frame of the press and the upper end of the said lever 105 is pivotally connected at 106ª to the right hand end of the control rod 102. It will be manifest that when the shaft of the press rotates in the direction of the arrow 107, the last half of each revolution is effective to raise the shearing punches, and at the same time the cam 103 operates to move the control rod 102 longitudinally and thus elevate the gauge plates 90 permitting the severed lengths of angle irons to be propelled into the straightening apparatus by the constantly running supporting rolls 42, and as the shaft of the press completes the revolution, the cam 103 permits the lever 104 to return to the initial position, and the gauge plates 90 are thus free to return under the tension of the spring 92 to the position to be engaged by the end of the bar stock. It will be observed that the rolls 42 are of larger diameter than the feed rolls 44, and as these rolls are operated at the same rate of speed, the rolls 42 will advance the severed length faster than the feed rolls 42 advance the bar stock, thereby separating the severed length from the new stock and affording an opportunity for the gauge plates 90 to drop down into position to be engaged by the forward end of the new stock. This separation is further effected by reason of the fact that the pressure roll 122 which, as hereinafter indicated, is released by the cam 133 during the cutting operation, does not become effective till after the stop 90 is released, and delays advancing of the bar stock until after the severed length begins to move forward.

In order to insure maximum efficiency and economy in operation, I prefer to control the treadle 26 of the press automatically so that when the ends of the angle irons 28 engage the gauge plates 90, the press will automatically be brought into action to sever the lengths of angle. This is effected in the present instance electrically by means of a solenoid 108 having a plunger 109 with a lower extension 110 which is arranged to engage the top of the treadle 26 and cause the press to operate. The circuit of said solenoid 108 will be completed, as shown in Fig. 11, when both of the angle irons strike the gauge plates 90.

Referring to Fig. 12 it will be observed that the plunger 89 is normally forced outwardly against the stripper 91 by means of the coil spring 111 mounted in a cylindrical aperture at the base of the pedestal 92 and engaging a small pin or plunger 112, the movement of said plunger 112 being transmitted to a push-rod 113 co-axial therewith and having its front end engaging the rear face of the plunger 89. Interposed between the adjacent ends of the plunger 112 and push-rod 113 is the depending arm of a lever 114 pivoted upon a short horizontal transverse shaft 115.

The boss of the lever 114 has an upwardly projecting lug 116 to which is secured, but insulated therefrom, an upwardly extending plate spring 117. The upper end of said plate spring 117 carries a small socket 118 in which there is adjustably secured a contact rod 119 of carbon or other suitable conducting material. It will be understood that each of the plungers 89 has associated therewith its own control spring 111 and associated parts including the contact rod 119, but the two contact rods 119 are both arranged to make contact with a common contact plate 120 supported by but insulated from the frame of the pedestal 82.

By inspection of the circuit diagram shown in Fig. 11, it will be seen that the circuit of the solenoid 108 is not completed through the battery 121, or other source of electric current, until both of the contacts 119 have engaged the contact plate 120. However, if at any time it becomes desirable to operate the apparatus at reduced capacity by feeding in only one length of angle iron at a time, one of the switches 122 may be closed thus short circuiting that side of the apparatus which is controlled thereby and permitting the other side of the machine to operate automatically with full efficiency.

In certain cases, where it is desirable to suspend or arrest the forward feeding movement of one or both of the angle irons which are to be severed into lengths and straightened, special means may be provided to relieve the feeding pressure upon the end of the angle iron supported on the initial feed roll 44. The angle iron is normally held down in driving engagement with the constantly running initial feed roll 44 by means of a pressure roll 123; each of said pressure rolls 123 being independently journaled in the end of the horizontal arm 124 of a bell crank lever 125 pivoted on a horizontal transverse pin or shaft 126 carried in the upper end of a stationary bracket 127. There is also rotatably mounted upon the shaft 126 a cast bracket arm 128, said bracket arm 128 having an upstanding portion, to the upper end of which is pivotally connected one end of the link 129. The other end of the said link 129 is pivotally connected to the lower end of a lever 130 horizontally pivoted to the face of the press frame, the upper end of the said lever 130 carrying the cam roll 131.

The cam roll 131 is arranged to ride upon a cam 132 secured to the front of the cross head 26 of the press, the upper end of said cam 132 being beveled as shown at 133 so that when the crosshead 26 descends the cam roll may move to the left and permit the upper end of the pivoted bracket arm 128 to swing outwardly. Normally, however, when the angle iron is being fed forward the bracket arm 128 is held in position as shown in Figs. 1 and 7. Formed as integral parts of the bracket arm 128 are a pair of cylinders 134 which contain adjustable compression springs 135 surrounding rods 136 axially disposed and slidable in said cylinders. Each of the rods 136 protrudes from each end of its cylinder 134 and is forced to the left by reason of the left hand end of said spring 135 engaging a collar 137 fixed on or formed as an integral part of the rod 136.

Figures 3, 9:
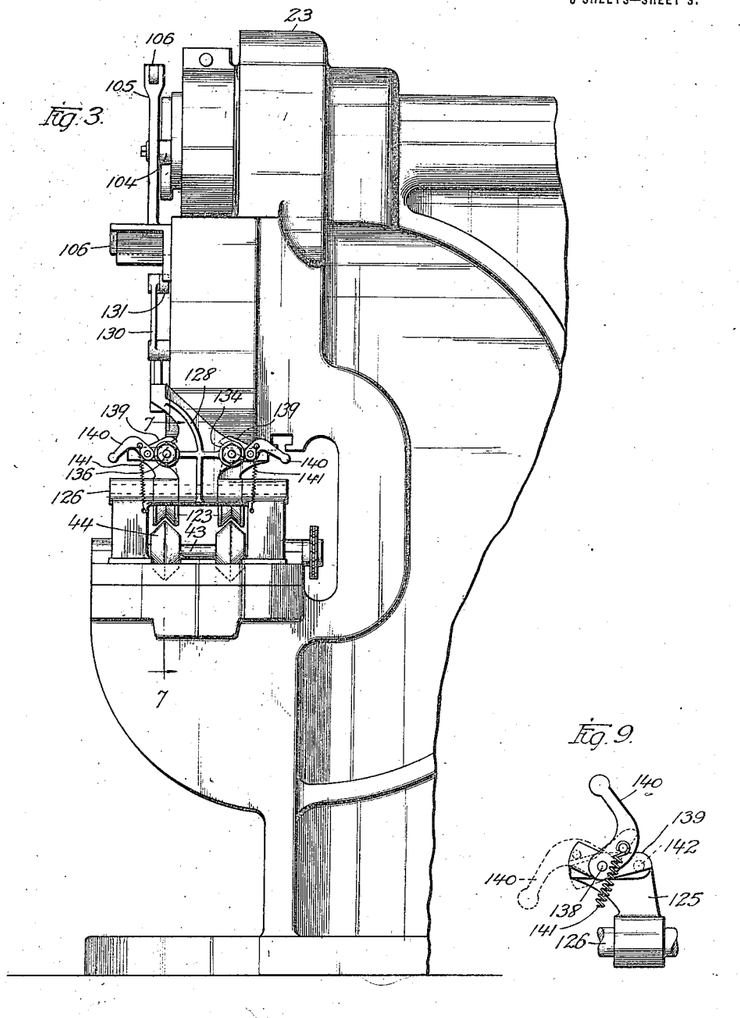
Fig. 3 is an end view looking from the right hand of Fig. 1.
Fig. 9 is a detailed view of one of the feed controls.

By inspection of Fig. 7 it will be seen that there is only a slight amount of clearance between the collar 137 and the left end of the cylinder 134. Referring now to Figs. 7 and 9, it will be noted that the upper arm of the bell crank lever 125 is off-set, the offset end carrying a fixed pin 138 upon which are pivoted a dog 139 and a hand lever 140. The hand lever 140 carries a pin, the ends of which project from either side of said lever, one end being arranged to engage either arm of the dog 139 and the other end having secured thereto a tension spring 141, the lower end of said tension spring being secured to a screw or pin fixed on the top of the bracket 127. The function of the spring 141 is to hold the lever 140 either in its full line position as shown in Fig. 9 or in its dotted line position.

The dog 139 has a limited amount of pivotal movement on the bell crank lever 125 so that the end thereof may be inserted between the point of the pressure applying rod 136 and the face 142 of the end of the bell crank lever upon which said dog 139 is pivotally mounted. The edgewise thickness of the end of said dog 139 is greater than the amount of clearance between the collar 137 and the end of the cylinder 134 so that when the end of the said dog 139 is not inserted between the end of the rod 136 and the face 142 of the bell crank 125, the collar 137 engages the end of the said cylinder 134 and the point of the pressure applying rod 137 does not press against the face 142 of the bell crank 125. Hence, whenever the hand lever 140 is in a full line position the pressure roll 123 controlled thereby will be effective to feed forward the angle iron thereunder, but when the said hand lever 140 is moved down into the dotted line position, the pressure will be withheld from the roll 123 which will be ineffective to feed forward the angle iron.

The cam 133 greatly facilitates the insertion of the dog 139 between the end of the pressure rod 137 and the face 142, the springs 135 being somewhat too powerful for the average man to control by hand.

The described details of mechanical construction are merely illustrative of one phase of my invention, the scope of which should be determined by reference to the appended claims.

I claim—

1. In apparatus for cutting and straightening lengths of metal, the combination of straightening mechanism, severing mechanism and propelling mechanism interposed between said straightening and severing mechanisms and adapted to withdraw the cut-off length of metal from the severing mechanism at a greater speed than the metal stock and feed same endwise to the straightening mechanism.

2. The combination of severing mechanism for cutting off the lengths of metal from a longer length, means for feeding the latter length of metal into the field of the cut-off mechanism, straightening mechanism aligned with the feeding and cut-off mechanisms, and transfer mechanism interposed between and aligned with straightening and cut-off mechanisms and adapted to advance the severed length of metal endwise to the straightening mechanism at a higher rate of speed than the metal stock is advanced by the feeding means so as to separate the severed length from the metal stock.

3. The combination of straightening mechanism, transfer mechanism, severing mechanism and feeding mechanism for operating upon lengths of metal, the arrangement including a series of axially parallel rollers for supporting the metal lengths, and advancing same to the straightening mechanism, said rollers being associated with the straightening, transfer and feeding mechanisms and means for continuously driving said rollers so as to propel the severed lengths of metal faster than the metal stock is propelled by the feeding mechanism.

4. The combination of constantly running straightener rolls, cut-off mechanism, propelling rolls interposed between the cut-off mechanism and the straightener rolls, means for constantly operating said propelling rolls, means for periodically operating said cut-off mechanism, and means for temporarily rendering the propelling mechanism ineffective during the operation of the cut-off mechanism.

5. The combination of constantly running straightener rolls, cut-off mechanism, propelling rolls interposed between the cut-off mechanism and the straightener rolls means for constantly operating said propelling rolls, means for periodically operating said cut-off mechanism, and means for temporarily rendering the propelling mechanism ineffective during the operation of the cut-off mechanism, said cut-off mechanism including means for rendering said propelling mechanism effective subsequent to the operation of the cut-off mechanism.

6. In mechanism for cutting off standard lengths of attenuated material, the combination of a cut-off device and a straightening mechanism, means including a stop interposed between the cutting off device and the straightening mechanism for measuring the length of material which is to be severed, and means controlled by the operation of the severing device for releasing said stop so as to permit movement of the cut-off length of material to the straightening mechanism.

7. In apparatus for cutting off standard lengths from a supply of attenuated material, the combination of a cut-off member and a straightening mechanism, means for operating said cut-off member, means for conducting the material lengthwise into the field of said cut-off member, a stop for limiting the said lengthwise movement of the material, propelling mechanism for delivering the length of cut-off material intermittently to the straightening mechanism, and means controlled by the operation of the cut-off member for withdrawing said stop to render effective said delivery mechanism.

8. In apparatus for severing standard lengths from a supply of attenuated material, the combination of a reciprocatory cut-off member and a constantly driven straightening mechanism, means for conducting the material longitudinally into the field of said cut-off member, a reciprocatory stop, said stop and cut-off member being arranged to move transversely of the length of material, constantly running mechanism for propelling the material, means for intermittently operating the cut-off member, and a member associated with and connected to said cut-off member for withdrawing said stop away from the material whereby the operation of the cut-off member renders the propelling mechanism effective to move the severed length intermittently to the straightening mechanism.

9. In apparatus for severing equal lengths from a supply of attenuated material, the combination of a severing device and a straightening mechanism, a source of power having connections for operating the severing device and straightening mechanism, so that the latter advances the product of the severing device therethrough as fast as such product is discharged from the severing device, clutch mechanism for connecting said cutoff member with the said source of power, a series of propelling rolls for carrying away the lengths of cut-off material, means for constantly operating said propelling rolls, a movable stop for gauging the length of the material prior to the operation of the cut-off member and adapted to arrest the progress of the latter and means for causing operation of the cut-off member connected to said stop and operable thereby when the movement of the material is arrested.

10. In apparatus for severing equal lengths from a supply of attenuated material, the combination of a cutting-off device, a source of power, clutch mechanism for connecting said cut-off member with the said source of power, a series of propelling rolls for carrying away the lengths of cut-off material, means for constantly operating said propelling rolls, a straightening mechanism operated from said source of power, for automatically receiving the lengths of cut off material from the propelling rolls, a movable stop for guaging the length of the material prior to the operation of the cut-off member and adapted to arrest the progress of the latter and means for causing operation of the cut-off member connected to said stop and operable thereby when the movement of the material is arrested, the arrangement including means controlled by the movement of the cut-off member for rendering the propelling rolls effective to move the length cut off.

11. In apparatus for severing equal lengths from a supply of attenuated material, the combination of a severing device, a gauge member for measuring and arresting the movement of the material which is to be severed, said gauge member being capable of transverse movement and also capable of being moved a limited extent longitudinally by the end of the material length, means controlled by the longitudinal movement of said gauge member for operating the severing device, means controlled by the operation of the severing device for effecting transverse movement of said stop and a straightening mechanism beyond the gauge, provided with means for engaging the end of a length of the attenuated material, and withdrawing same beyond the gauge previous to measuring the next length of the attenuated material by the gauge member.

12. In an apparatus for cutting and straightening metal bars, the combination of a severing mechanism, means for intermittently feeding a metal bar so as to be operated on by the severing mechanism, and straightening mechanism adapted to automatically receive the lengths of the metal bar cut off by the severing mechanism, and move same away from the succeeding length, while the latter is being cut off.

13. In an apparatus of the class described, the combination of a mechanism for severing a metal bar into lengths, mechanism for performing an operation upon each length after it is severed, and means for advancing said metal bar and the lengths cut therefrom at different rates of speed so as to afford a gap between the successive lengths of the metal bar as they progress through the apparatus.

14. In an apparatus of the class described, the combination of a severing mechanism and a straightening mechanism, adapted to operate successively on a metal bar, means for interrupting movement of the metal bar and operating the severing mechanism, while the previously severed length is being carried through the straightening mechanism.

15. In an apparatus of the class described, the combination of an intermittently operable severing mechanism and a continuously operating straightening mechanism, mechanism for feeding a metal bar to the severing mechanism, and mechanism for regulating the length to be severed by the severing mechanism from the metal bar, and holding the latter stationary while the straightening mechanism advances and straightens the previously severed length of the metal bar.

16. In an apparatus of the class described, the combination of a severing mechanism and a straightening mechanism, adapted to operate successively on a metal bar, means for feeding a metal bar to the severing mechanism, means for measuring a length of the metal bar to be severed and arresting the movement of the metal bar and automatically operating the severing mechanism, said straightening mechanism being adapted to continue the movement of and operate upon the previously severed length of the metal bar as the succeeding length is being severed.

17. In an apparatus of the class described, the combination of a severing mechanism and a straightening mechanism, adapted to operate successively upon a metal bar, propelling mechanism for advancing the metal bar to the severing mechanism, and means for automatically interrupting the movement of the metal bar by the propelling mechanism, and operating the severing mechanism, while a previously severed length is being advanced through the straightening mechanism, said propelling mechanism being adapted to automatically re-engage and advance the severed length of the metal bar to the straightening mechanism after the severing operation.

18. In an apparatus of the class described, the combination of a severing mechanism and a straightening mechanism, adapted to operate successively on portions of the metal bar, and means for spacing the severed lengths from the metal bar, and feeding said lengths to the straightening mechanism.

JOHN F. GAIL.